H. A. COOK.
PLANT WATERER.
APPLICATION FILED JAN. 8, 1921.
1,424,157.
Patented Aug. 1, 1922.
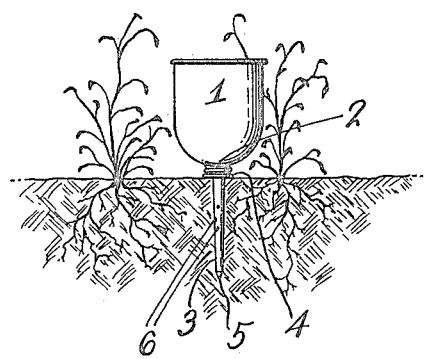
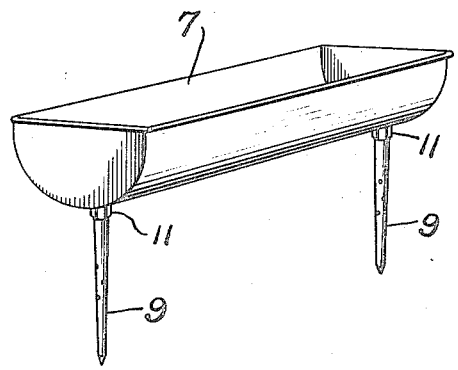
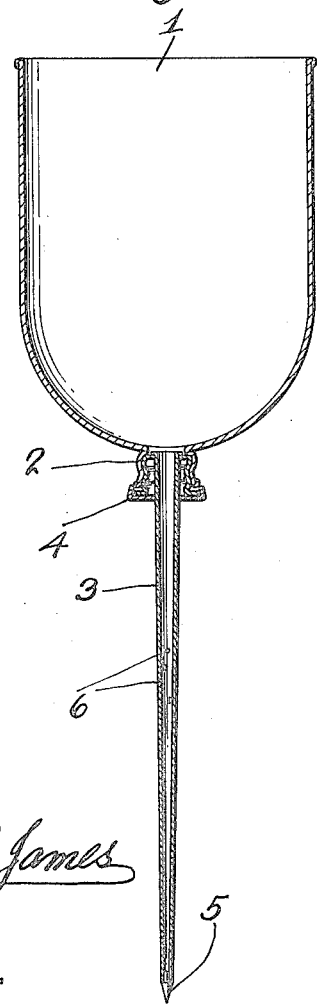
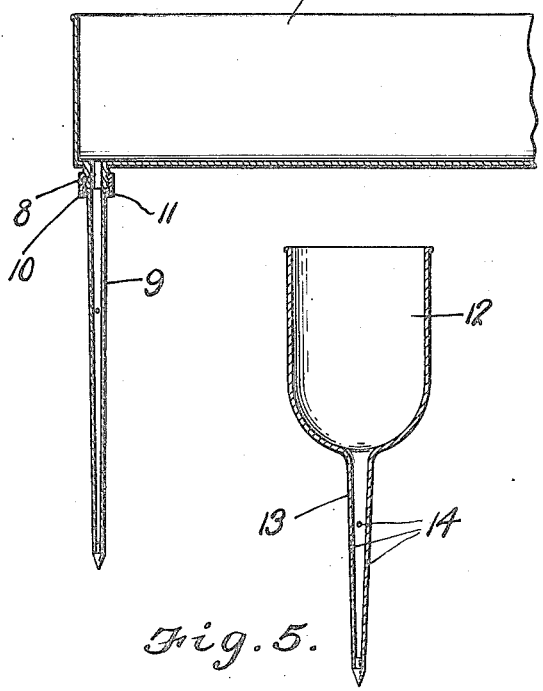
H. A. Cook, INVENTOR

UNITED STATES PATENT OFFICE.

HARRY A. COOK, OF DIXON, NEBRASKA.

PLANT WATERER.

1,424,157.                    Specification of Letters Patent.    Patented Aug. 1, 1922.

Application filed January 8, 1921. Serial No. 435,901.

*To all whom it may concern:*

Be it known that I, HARRY A. COOK, a citizen of the United States, residing at Dixon, in the county of Dixon and State of Nebraska, have invented new and useful Improvements in Plant Waterers, of which the following is a specification.

My present invention has reference to a plant watering device.

My object is to produce a device of this character in which water will be directed below the outer surface of the soil, so that the soil around the roots of the plant will be moistened.

A further object is the provision of a plant watering device which may be ornamental in appearance and which includes a water receptacle having at the bottom thereof downwardly directed spouts, said spouts having their outer ends closed and their body portions provided with minute apertures, the spouts designed to be forced into the soil, so that the water from the receptacle will be directed into the spouts and percolated therethrough on to the soil in close proximity to the roots of the plant.

The foregoing and other objects by which the nature of the invention is better understood, may be accomplished by a construction, combination and arrangement of parts such as is disclosed by the drawings which accompany and which form part of this application.

In the drawings:—

Figure 1 is a view illustrating the application of one form of the improvement.

Figure 2 is a greatly enlarged vertical longitudinal sectional view through the improvement.

Figure 3 is a perspective view showing a modification.

Figure 4 is an approximately central longitudinal sectional view therethrough.

Figure 5 is a transverse sectional view through a further modification.

In the watering of garden plants or vegetables, in the usual manner, the water is directed only on the top of the plants and the top surface of the soil. The water on the top of the soil soon evaporates and causes the soil to be baked in warm weather, and the warm weather scalds the leaves of the plants. In addition to this the plants must be watered almost daily.

With my improvement the water is delivered beneath the surface of the soil, so that the said soil below its outer surface will be properly moistened, and such moisture delivered to the roots of the plants.

In the construction illustrated in Figures 1 and 2 of the drawings the improvement is devised for use in watering single plants, although the same may be arranged between a number of bunched plants to deliver water adjacent to the roots of all of such plants.

The improvements contemplates the employment of a receptacle 1, which, in the said showing, is in the nature of a bowl and which has its closed end provided with a round neck 2 which is threaded. Screwed on the neck 2 is the open and widened end of a spout 3. The spout at its said widened end is flanged as at 4, and a gasket may be arranged between the flange and the bottom of the receptacle 1. The pointed end of the spout is closed, as indicated by the numeral 5, but the body of the spout is provided with spaced minute apertures 6. Through these apertures the water percolates, as the same is received in the spout from the receptacle. The water from the spout is directed at varying angles, so that the under surface of the soil will be properly moistened at varying desired points. As a matter of fact all of the soil surrounding the spout will be properly moistened and such moisture will be conveyed to the roots of the plants.

In the remaining figures of the drawings the device is especially adapted for moistening the roots of a number of plants. The water receptacle is indicated by the numeral 7, and is of the nature of an elongated trough-like member. Adjacent to the ends and at the bottom of the trough or receptacle 7 there are threaded outlet pipes 8, similar to the threaded neck 2 of the receptacle 1. These threaded pipes are engaged by spouts 9 which are similar to the spouts 3, the said closed ends of the spouts being pointed and the bodies thereof being provided with spaced apertures. However, I preferably arrange around the flange 10 at the open end of the spouts 9 a coupling 11 which has interior threads to engage with the exterior threads on the pipe elements 8. By this arrangement it will be seen that the receptacle 7 can be separated from the spouts without necessitating withdrawal of the spouts from the soil. With the construction illustrated in Figures 1 and 2 the bowl shaped receptacle is unscrewed from the spout when the removal of the spout is not required.

With a plant moistener, constructed in accordance with my invention, the plants may have their roots continuously moistened for an extended period without necessitating the refilling of the receptacles 1 or 7, and it is thought that the foregoing description when taken in connection with the drawings will fully set forth the construction and advantages of the improvement.

In Figure 5 of the drawings, the water receptacle 12 has its outlet spout 13 integrally formed on the base of the body thereof, the said spout having its end closed and provided with minute apertures 14. The device is used as are the constructions above described, and as the spout may be soldered or stamped with the body the same may be more cheaply manufactured than the first mentioned constructions.

What I claim is:—

1. A plant waterer of the class described including a receptacle and a spout removably secured to said receptacle and extending downwardly therefrom said spout having its outer closed end pointed and the body apertured, said spout having its open end widened and threaded and screwed on the neck, a flange provided on the spout at its said widened end, said flange supporting the receptacle above the surface of the ground and preventing the spout from further penetrating the ground.

2. A device for moistening the roots of plants including a water receptacle having an outlet spout removably secured to the bottom thereof, said spout being apertured and having its outer end pointed and closed, and means connecting the spout to the receptacle designed to rest on the ground to limit the penetration of the spout in the ground and to serve as a supporting means for the receptacle when in apertured position.

In testimony whereof I affix my signature.

HARRY A. COOK.